(12) United States Patent
Avery

(10) Patent No.: US 8,756,909 B2
(45) Date of Patent: Jun. 24, 2014

(54) AIRCRAFT ENGINE PROTECTION DEVICE

(75) Inventor: Donna Avery, Teaneck, NJ (US)

(73) Assignee: The CTFOT Group LLC, Teaneck, NJ (US)

(*) Notice: Subject to any disclaimer, the term of this patent is extended or adjusted under 35 U.S.C. 154(b) by 1007 days.

(21) Appl. No.: 12/840,935

(22) Filed: Jul. 21, 2010

(65) Prior Publication Data

US 2011/0016845 A1    Jan. 27, 2011

Related U.S. Application Data

(60) Provisional application No. 61/271,496, filed on Jul. 22, 2009.

(51) Int. Cl.
*F02C 7/05* (2006.01)
*F02C 7/055* (2006.01)

(52) U.S. Cl.
USPC ...................................... 60/39.092; 137/15.1

(58) Field of Classification Search
CPC .................................. F02C 7/05; F02C 7/055
USPC ............ 60/39.092, 39.091; 415/121.1, 121.2; 137/15.1, 15.2
See application file for complete search history.

(56) References Cited

U.S. PATENT DOCUMENTS

| | | | | |
|---|---|---|---|---|
| 1,807,521 | A * | 5/1931 | Foulk ............................... | 55/486 |
| 4,833,879 | A * | 5/1989 | Verduyn et al. ............ | 60/39.092 |
| 5,143,321 | A * | 9/1992 | Jackson ..................... | 60/39.092 |
| 6,371,242 | B1 * | 4/2002 | Wilson et al. ................. | 181/292 |
| 6,387,142 | B1 * | 5/2002 | Pieciak et al. .................. | 55/493 |
| 6,409,805 | B1 * | 6/2002 | Beier et al. ....................... | 55/486 |
| 7,803,204 | B1 * | 9/2010 | Mladinich .................. | 60/39.092 |
| 2009/0288592 | A1 * | 11/2009 | Kato et al. .................... | 427/228 |
| 2011/0011055 | A1 * | 1/2011 | Troy .......................... | 60/39.092 |

\* cited by examiner

*Primary Examiner* — Ted Kim
(74) *Attorney, Agent, or Firm* — Leason Ellis LLP

(57) ABSTRACT

A jet engine intake guard includes an engine sleeve located within the nacelle of the engine; a primary deflection screen located at a front portion of the sleeve and having a first circular frame formed of a tubular fabric member and a plurality of fiber yarn strings disposed across the diameter of the primary frame and attached to one another in a tri-axel weave pattern. The guard also includes a secondary deflection screen located behind the primary deflection screen in the direction of air flow through the engine and having a second circular frame formed of a tubular fabric member and a plurality of fiber yarn strings disposed across the secondary frame and attached to one another in a tri-axel weave pattern. The guard further includes a capture basket located between the primary and secondary deflection screens. The capture basket has a first wall located toward the primary deflection screen, a center portion and a second wall located toward the secondary deflection screen. In a preferred embodiment the entire guard is made of woven carbon fiber.

10 Claims, 7 Drawing Sheets

AIRCRAFT ENGINE PROTECTION DEVICE

RELATED APPLICATION DATA

This application claims priority to provision application No. 61/271,496, filed on Jul. 22, 2009.

BACKGROUND OF THE INVENTION

This invention relates to aircraft engine protection devices and, more particularly, to covers placed in front of the fan blades of aircraft engines so as to prevent the intrusion of foreign bodies. The present invention is directed to a device designed to prevent the intake of both large animals and foreign objects into the aircraft.

Protecting airplanes from damage due to birds or other airborne hazards has long been the goal of the prior art. While a direct strike on a fuselage is damaging to the airframe, the more pressing issue is when a bird strikes or other airborne hazard strikes the internal machinery of the engine assembly. Bird or foreign body strikes can cause catastrophic engine failure, resulting in loss of control of the airplane and possibly a forced or emergency landing. Currently, there is no effective device that both protects the engine while providing a non-lethal solution to prevent birds from entering the engine housing.

Problems caused by the injection of foreign objects into the inlet of engines has been previously known and recognized. For example U.S. Pat. Nos. 7,615,087; 4,833,879; 5,411,224; 3,426,981 and US App 2009/0101760, all discuss the danger of foreign bodies striking the engine intake and propose solutions. They are all hereby incorporated by reference. However, such devices and systems are known to limit engine thrust or create other problems with weight, maintenance, or cost. For example U.S. Published Application No. 2009/0101760 to Ghogomu provides for a protective screen designed to be mounted at the front of the intake of a jet engine nacelle. It is in the shape of a radial dome-shaped screen with interlocking wire mesh, rods and bars. While the Ghogomu prior art seeks to prevent foreign bodies from entering the engine intake, it does so in a manner that extends the profile of the engine, requires metal construction, and is capable of becoming a hazard itself if damaged.

Another example of failed design choices can be seen in U.S. Pat. No. 5,411,224 to Dearman et al. Dearman provides for a guard apparatus to be positioned in front of a jet engine intake that has a plurality of concentric rings of gradually decreasing diameter beginning at the cowl of the engine and descending in circumference towards a front end. Through this shape, Dearman also provides a conical cover to the engine cover. As in Ghogomu, the engine cover is formed of metal rods and bars formed into a structural mesh. While the device would clearly prevent foreign bodies from entering the engine intake, there are significant drawbacks. For instance, the profile of the guard apparatus extends beyond the cover of the engine such that the profile of the air plane has been changed. Additionally, the guard is formed of metal and could pose a significant foreign body risk if damaged.

It would therefore be of benefit to provide an engine intake cover that does not increase the physical dimensions of the aircraft. Furthermore, it would be of benefit to provide an aircraft engine intake cover that resisted entry of foreign bodies while decreasing possibility of engine damage if the cover should be breached or damaged.

SUMMARY OF THE INVENTION

The present invention provides an improvement over prior art guard devices used with jet engines. The apparatus is directed to a materially woven engine intake guard designed to fit within the engine nacelle of an aircraft. The device is characterized in part by a system of three interconnected protection modules. Each module is designed to provide an increasing level of protection as a foreign object penetrates further into the air intake portion of an engine.

The advantages of using a three module device of woven material secured inside the nacelle are readily apparent. By locating the guard device inside the nacelle, the device does not interfere with the profile of the aircraft and does not expose the guard to as much of the elements as in the prior art. The present invention also employs the use of a carbon fiber material weave, which foregoes the use of metal wires or bars. In this case, if the material guard does fail, the resulting shrapnel does not do additional damage to the engine turbine fans.

An illustrative embodiment of the invention envisions a jet engine guard device having three modules conferring progressive levels of impact protection to the engine air intake. Each of the guard modules is made of carbon fiber woven material and is formed so as to allow air to easily pass through the gaps in the weave, while providing intersections sufficient to prevent foreign bodies from passing through. Furthermore, carbon fiber allows the entire device to remain light weight. The engine protection device is designed as having a capture basket, which provides a tightly woven material body, touching the interior wall of the nacelle and extending into the interior volume. The capture basket is formed by a low wall of woven material joined to a high wall. In this configuration, material upon impacting the high wall is trapped between the low wall and high wall until it can be removed by maintenance personnel. The capture basket is able to catch foreign bodies as well as prevent interference with the engine turbines. The jet engine guard apparatus also has a tubular sleeve secured inside the nacelle with a second end that abuts the low wall of the basket and a first end that terminates before the opening of the nacelle. The engine protection device is configured, in part, to secure a first deflection screen located within the first end of the sleeve; as well as securing a second deflection screen located at the second end.

The present invention is also directed to a novel method for the manufacturing of the woven guard device. Within the disclosure of the present invention there is a novel weaving frame for use with the novel method.

The present invention in part, is directed to a method of weaving a tri-layer screen wherein a middle layer is woven on the weaving frame with filling yarn. The method includes, in part, a bottom layer formed of diagonal warp yarn starting at either the right or left side of the weaving frame and weaving the yarn of the bottom layer so that it is repeatedly interlaced over or under the middle layer. The final layer is envisioned as being formed by interlacing diagonal warp yarn with the middle yarn in the opposite direction from the bottom layer, and with interlacing opposite to that of the bottom layer. The present invention methodology is further characterized in that the three layers of weave are then formed into a fabric by the use of knots, wherein a first knot is tied along two horizontal filling yarns with a fiber. In the process of forming a second knot, the cord is placed where a fiber tow is long enough to wrap around the filling yarns. The cord is brought back to its starting position next to the first knot before being tied into a second knot. The method further uses a third knot tying step to secure the fiber so it cannot be untied or moved. Lastly, in a positioning step the remainder of the fabric is arranged so that it lays on the completed fabric, but is free to move.

It should be understood that various combinations, alternatives and modifications of the present invention could be devised by those skilled in the art. The present invention is intended to embrace all such alternatives, modifications and variances that fall within the scope of the appended claims.

BRIEF DESCRIPTION OF THE DRAWINGS

The foregoing and other features of the present invention will be more readily apparent from the following detailed description and drawings of illustrative embodiments of the invention in which the woven guard device and its components are more particularly described with reference to specific figures and reference numerals, wherein.

DESCRIPTION OF AN ILLUSTRATIVE EMBODIMENT

Figure 1:
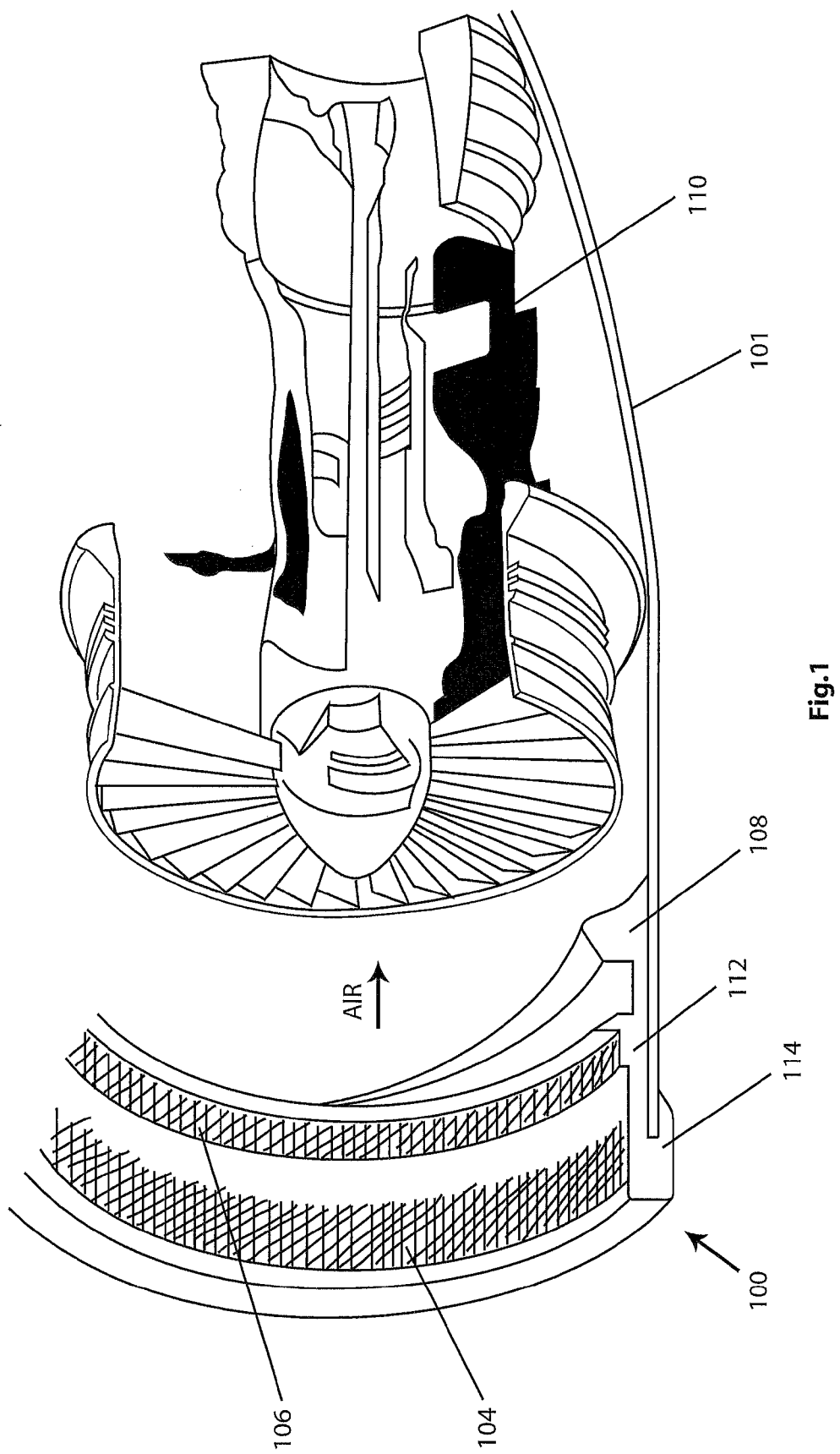
FIG. 1 is a partially broken right side perspective view of a jet engine equipped with the protection device of the present invention.
Figure 2:
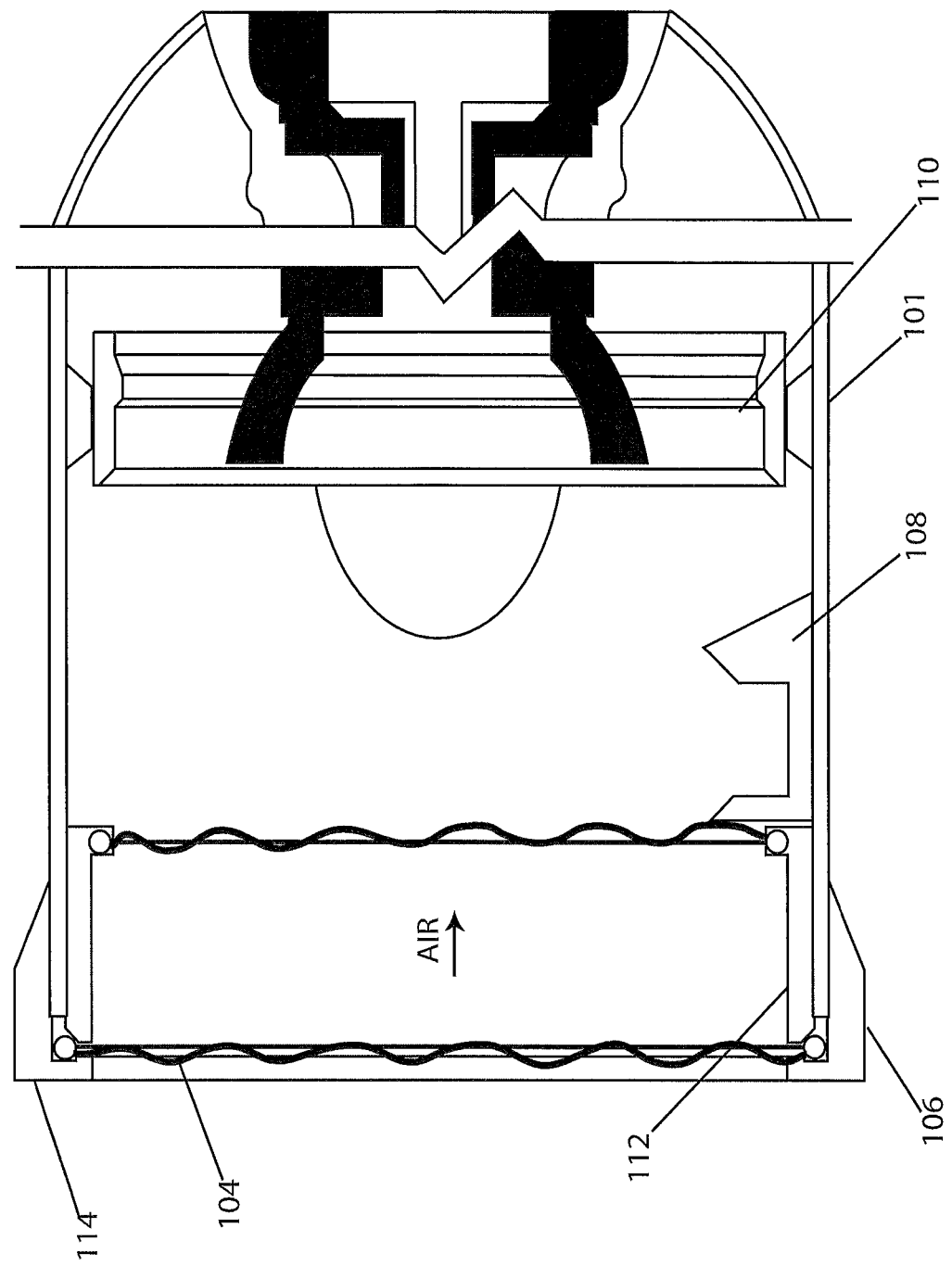
FIG. 2 is a cross-sectional view of the invention of FIG. 1.

FIGS. 1 and 2 show a partially broken and a cross sectional view, respectively, of a jet engine equipped with an embodiment of an engine protection device according to the present invention. In FIGS. 1 and 2 the engine protection device (100), is depicted as being fitted to an aircraft engine nacelle 101. The nacelle is a cover housing (separate from the fuselage) that holds the engine on an aircraft. The engine protection device has a first deflection web (104), a second deflection web (106) and capture basket device (108). The capture or arc basket 108 is fitted inside the engine nacelle (101) and rests upon the interior surface of the nacelle at a position in front of the engine turbine (110). The capture basket 108 has a curved profile (shown in FIG. 1), which extends along a portion of the circumference of the nacelle. The capture basket (108) has a high wall (206) and a low wall (204) (FIGS. 2 and 3) that cooperate to retain foreign bodies not deflected by the first and second deflection webs. In addition there is a sleeve inserted into the engine intake portion of the nacelle. The sleeve is configured to have an inner sleeve (112) connected to an outer sleeve (114). The interior sleeve (112) is formed so as to have a diameter that allows it to be securely fitted inside the interior of the nacelle. The outer sleeve (114) is configured to be secured over the exterior of the nacelle and to be coupled to the interior sleeve (112). The interior sleeve (112) is also designed to abut against the low wall (204) of the arc basket (108). Furthermore, an end of the interior sleeve (112) is designed to secure the first deflection web (104) in front of the air intake portion of the engine nacelle. The interior sleeve (112) is also configured to secure the second deflection web (106), at a position between the first deflection web (104) and the capture basket (108).

All the components of the engine protection device may be made of carbon fiber, or any other similar fiber material with a similarly high strength to weight ratio.

Figure 3:
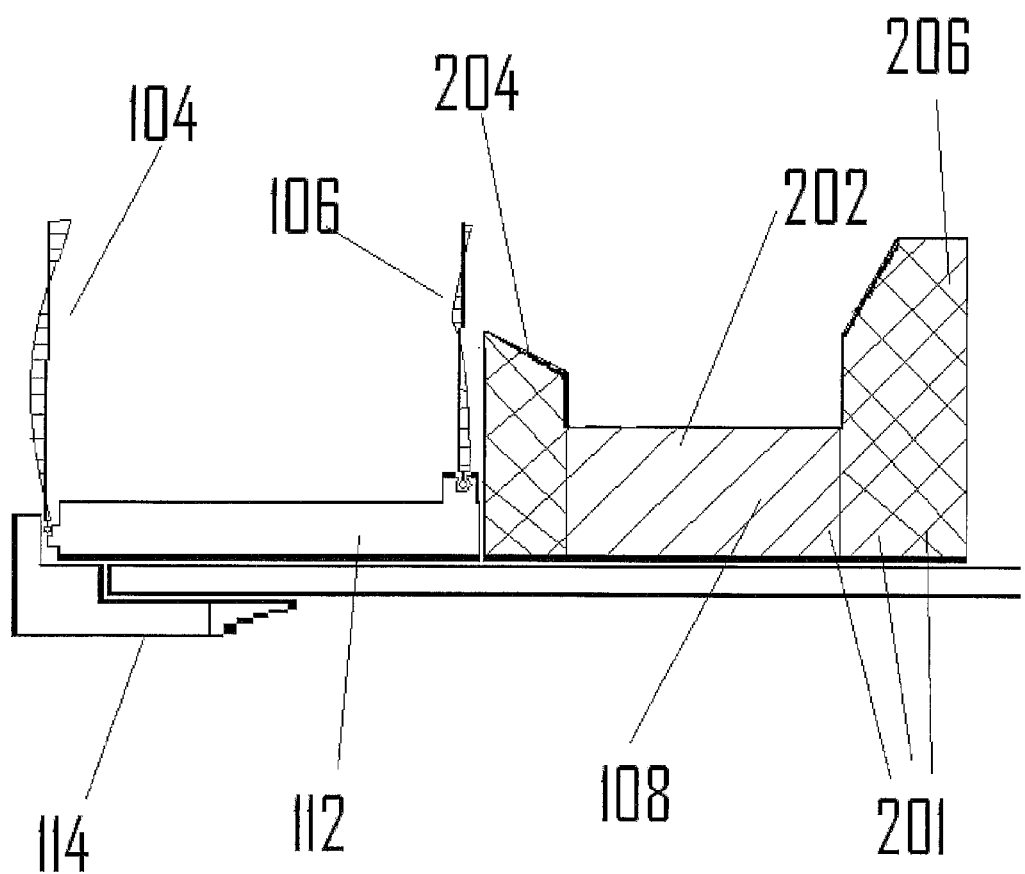
FIG. 3 is an enlarged view of the front lower portion of the illustrative diagram of the device as shown in FIG. 2.

As shown in FIG. 3, the capture basket device (108) has a ground portion, and two wall portions. The ground portion is formed of a two layer carbon fiber fabric woven from large diameter carbon tow or yarn (201), wherein a top and a bottom layer are of the same width. The two layer woven carbon tow forms the ground weave (202). The capture basket (108) is further configured to have a low wall (204) and a high wall (206) formed coextensively with the ground weave (202). Each of the low and high walls is formed of a tightly woven plain tubular braid. This braid is used to form a performance face or interior face (not shown) of a low wall and a performance face or interior face (not shown in detail, but see FIG. 1) of the high wall. The interior faces of both the low and high walls are joined to the ground weave by a triple tie knot (701), FIG. 6. The high wall (206) is formed to have a height greater than that of the low wall, thereby forming a basket between the low wall (204), high wall (206) and ground fabric (202).

Figure 6:
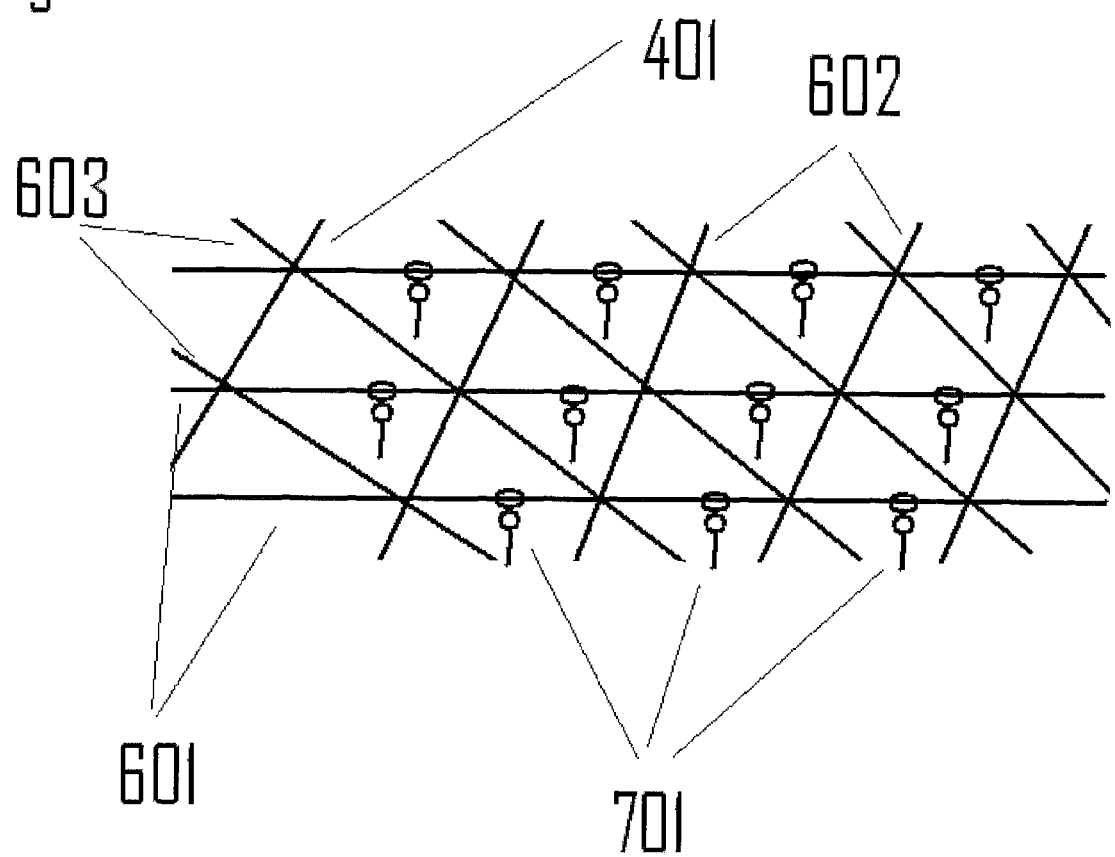
FIG. 6 is an enlarged view of the tri-layer fabric of the woven guard of the invention as shown in FIG. 5.

As further shown in FIG. 3, the second closed web (106) is secured to the end of the inner sleeve (112) so as to permit flexibility in its movement. Both the first and second deflection webs are formed of a tri-layer carbon tow weave (205). This tri-layer fabric weave is mounted on a tightly woven plain weave tubular braid frame (301) as shown in FIG. 4 with triple tie knots (701) as shown in FIG. 6.

Figure 4:
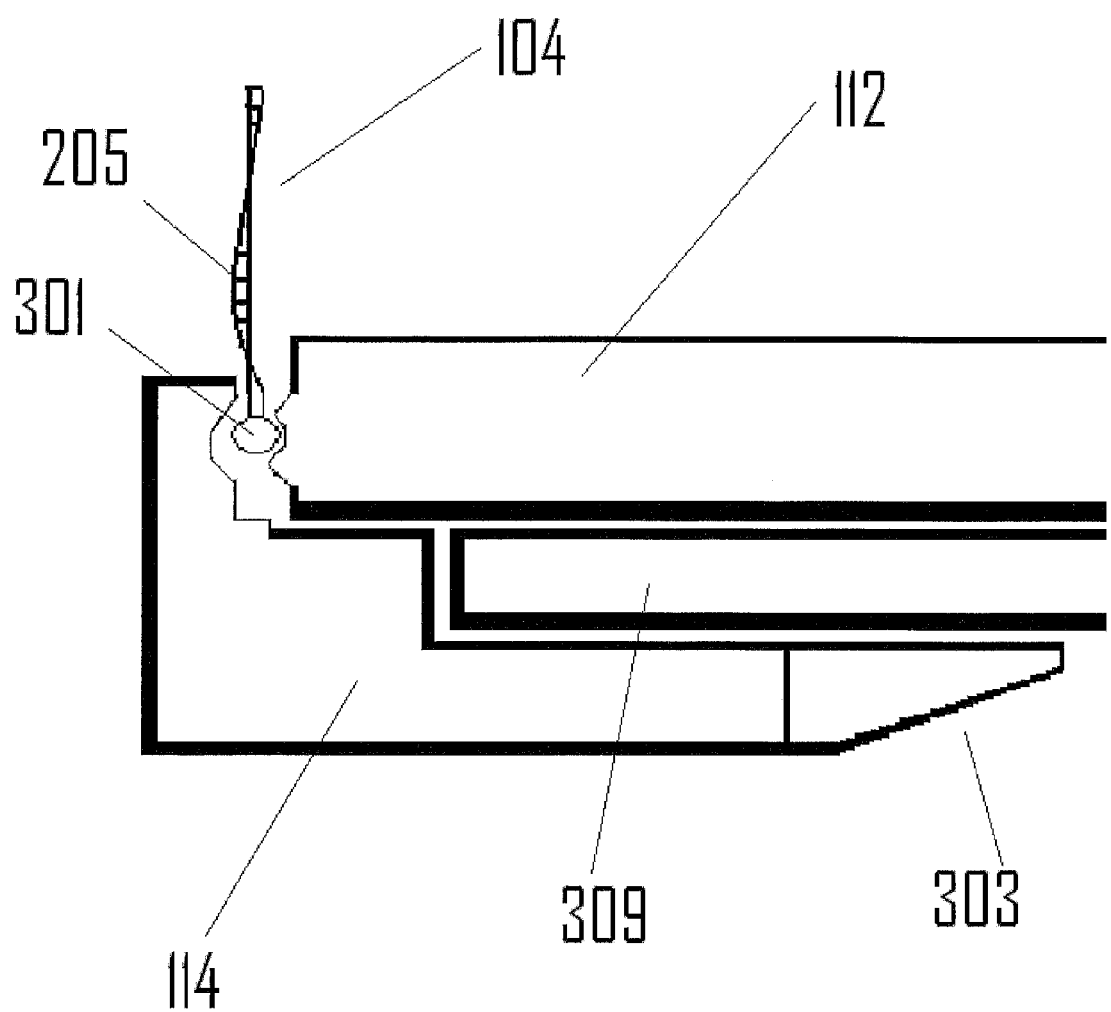
FIG. 4 is an even greater enlarged view of the front lower portions of the illustrative diagram of the device as show in FIG. 3.

As shown in greater detail in FIG. 4, the first deflection web (104) is secured between a first end of the interior sleeve (112) and a second end of the exterior sleeve (114). As shown in FIG. 3, the protective web (106) is secured by the coupling of the inner sleeve (112) to the outer sleeve (114). In coupling the inner (112) and outer sleeve (114), a space (301) is formed so as to allow the tubular frame to be secured without impinging on the flexibility of the web. Furthermore, the outer sleeve has an angled surface (303) that provides aerodynamic shaping to the nacelle. In this way the aerodynamic profile of the engine nacelle (101) and the aircraft in general is not significantly altered.

As further shown in FIG. 4, the first deflection web (104) is secured between the exterior sleeve (114) and the inner sleeve (112) so that the diameter of the first deflection web (104) is the same diameter as the engine nacelle (309).

Figure 5:
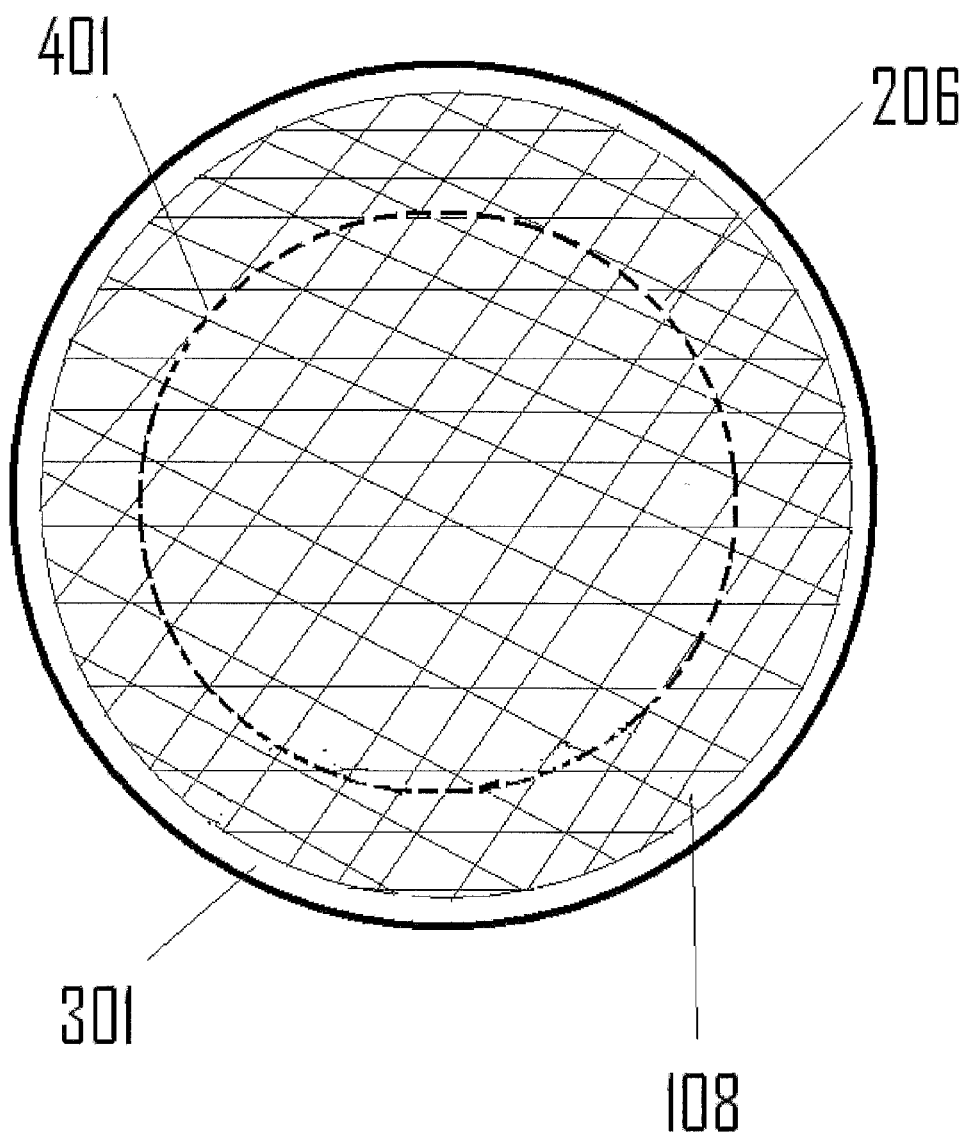
FIG. 5 is a front view of the woven guard of the invention shown in FIG. 2.

As further shown in FIG. 5, the capture basket (108) can be seen in dashed line relief. The high wall (206) attached to the and low wall (204) (not shown) can been seen when looking directly through the deflection web. Furthermore, the secondary defection web is not depicted for clarity, but can be orientated so that the intervening spaces of the tri-axial fabric (401) of the first deflection web and the second deflection web are not aligned. This provides an additional layer of protection, while allowing air to freely pass through both deflection webs and reach the turbine.

Figure 7:
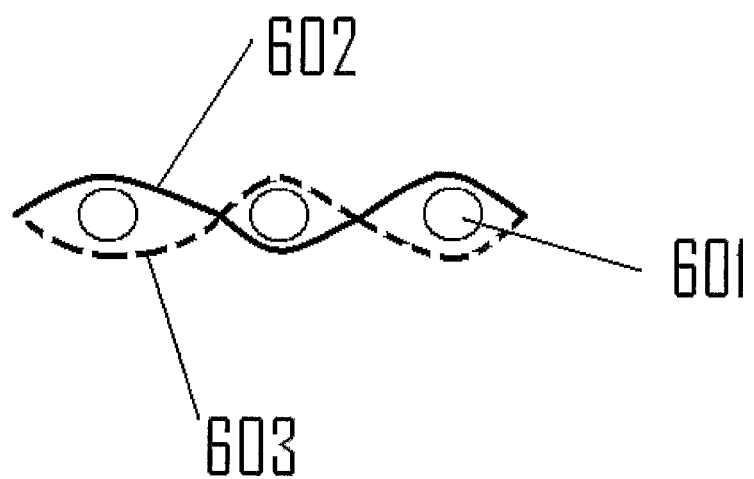
FIG. 7 is a cross-section through a portion of the fabric of FIG. 6.

FIG. 6, shows a preferred embodiment in which the first web is constructed of 98% to 100% carbon tow, which is woven into a tri layer, tri-axial fabric (401). The carbon tow weave is woven to create a fabric with at least three primary layers (not shown), a bottom (603), middle (601) and top layer (602), formed on a circular frame. The weaving frame (not shown) is designed to allow for the production of a square shaped tri-layer fabric (401). The bottom layer (603) is formed by wrapping carbon tow at a negative 45 degree (from horizontal) angle, left or right (or vice versa) on a 225" to 230" sq-on the weaving frame. The bottom layer (603) is interlaced with a middle layer (601) that is initially wrapped on the frame at a 90-degree angle. The top layer is formed by a positive 45 degree (from horizontal) or vice versa, depending on the bottom layer (603) wrapping direction. The top layer (602) is interlaced in the opposite direction as the bottom layer. For example, as shown in FIG. 7, if the top layer (602) is interlaced with the middle layer (601) as an over-under interlace, the bottom layer (603) is interlaced with the middle layer (601) as an under-over interlace. The three layers of the fabric are secured by a triple tie knot (701) as shown in FIG. 6. In this way, the resulting fabric cannot be untied or otherwise loosened. The tri-layer, tri-axial fabric (401) is then mounted on a circular frame (301). The frame is composed of a tightly woven tubular braid that has an interlocking closure that is devoid of any latches or fasteners. The circular frame (301), once constructed only needs to be cut once, since the circumference of the frame can be adjusted by inserting one end of the tubular braid into the other end. It is envisioned that the expansive pressure of the inserted tubular braid will prevent the circular frame from changing shape. However, it is advised that a standard screw and fastener be used to ensure the proper dimension. The tri-layer, tri-axial fabric (401) is then secured to the circular frame (301) with standard screws at regular intervals around the circumference of the circular frame.

As shown in FIG. 6, the triple tie knot (701) is used to secure the different layers of the tri-layer, tri-axel fabric in to a cohesive whole. The triple tie knots (701) are formed of the same carbon tow as the fabric yarn. The triple tie knots are formed by tying a first knot of carbon tow along the horizontal yarns of the middle fabric layer. Then a second knot is formed in the location where there is enough carbon tow to wrap around the middle and top or bottom yarn layer. The yarn forming the second knot is brought back to a position adjacent to the first knot, before it is tied into the second knot. Lastly, a third knot is tired, one that secures the carbon tow and prevent the first and second knots from being undone.

In this way, and through the recited elements, it is envisioned that the capture basket and the first and second webs are located within the engine nacelle. Upon operation of an aircraft, the airflow though the engine nacelle is not significantly diminished. However, upon encountering a foreign body, e.g., a bird, the first web, second web and capture basket form a triple layer of defense. The first layer is designed to prevent the entry of foreign bodies. If the first layer is breached, the second layer, which has a smaller diameter, resulting in stronger resistance, will prevent the now slowed foreign body. Any objects or portions of objects that pass through the second barrier will become lodged in the capture basket and retained until they can be removed by maintenance personal. Furthermore, the carbon fiber fabric allows for broken pieces of the actual deflection webs and capture basket to safely pass through the engine without significant physical harm.

A methodology is envisioned related to the construction of the three part engine protection device, with reference to the previously illustrated figures. An alternative embodiment of the protection device involves a weaving step for producing a carbon fiber fabric out of three distinct layers of carbon tow yarn as shown in FIG. 6. The frame and woven fabric are transported to a mold fitting the dimensions of an engine nacelle. A further manufacturing step involves matching the center of the fabric with center of the mold so that the fabric is centered. A further step requires the fitting of a carbon fiber to a circular tubular woven frame mounted on the mould and securing the fabric to the mould with top securing screws. An additional manufacturing step requires removing the completed fabric and frame from the mold. Each layer of the fabric is woven so that the overall fabric has openings of sufficient size to allow air to pass through, while being sufficiently woven to prevent foreign objects from passing through. Each of the three layers is secured to one another by a triple tie knot.

It should be understood that various combinations, alternatives and modifications of the present invention and embodiments could be devised by those skilled in the art. The present invention is intended to embrace all such alternatives, modifications and variances that fall within the scope of the appended claims. In particular, the invention has been particularly shown and described with reference to preferred embodiments thereof, but it will be understood by those skilled in the art that various changes in form and details may be made therein without departing from the spirit and scope of the invention.

I claim:

1. A jet engine intake guard apparatus comprising:
an engine sleeve located within the nacelle of the engine;
a primary deflection screen located at a front portion of the sleeve, said primary deflection screen having a first frame formed of a tubular fabric member and a plurality of fiber yarn strings disposed across the width of the primary frame and attached to one another in a tri-axel weave pattern;
a secondary deflection screen located behind the primary deflection screen in the direction of air flow through the engine, said secondary deflection screen having a second frame formed of a tubular fabric member and a plurality of fiber yarn strings disposed across the secondary frame and attached to one another in a tri-axel weave pattern; and
a capture basket located after the secondary deflection screen in the direction of air flow through the engine, said capture basket having a first wall located toward the secondary deflection screen, a center portion and a second wall located toward the engine, wherein the center portion has a proximal end and a distal end, wherein the proximal end is joined to the first wall, the distal end is joined to the second wall, the center portion being sized and configured to be placed against an interior surface of the nacelle.

2. The engine intake guard of claim 1, wherein the engine sleeve includes an inner sleeve and an outer sleeve, the inner sleeve having a tubular profile with a front end and a back end configured to be mounted inside a front end of the engine nacelle, wherein the front end of the inner sleeve is positioned inside the engine nacelle and is adapted for connection to the first circular frame of the primary deflection screen, and the back end of the inner sleeve is adapted for connection to the second circular frame of the secondary deflection screen and to abut the front wall of the basket;
wherein the outer sleeve includes a front end and a back end disposed to fit over the front end of the engine nacelle, the front end of the outer sleeve being adapted for connection to the primary circular frame of the primary deflection screen; and
wherein the first frame and the second frame are circular and the plurality of fiber yarn strings are disposed across the diameter of the circular frames.

3. The engine intake guard of claim 1, wherein the primary and secondary screen, primary and secondary tubular frame and the capture basket are all formed of woven carbon fiber.

4. The engine intake guard of claim 1, wherein the diameter of the primary circular frame is greater than the diameter of the secondary frame.

5. The engine intake guard of claim 1, wherein the second wall of the capture basket is higher than the first wall of the basket.

6. The engine intake guard of claim 1, wherein the primary and secondary deflection screens are comprised of a top, middle and a bottom layer of carbon fiber yarn.

7. The engine intake guard of claim 6, wherein the bottom layer is interlaced with the middle layer and the top layer is interlaced with the bottom layer.

8. The engine intake guard of claim 7, wherein all of the top and bottom layers are angled at 45 or 135-degrees with respect to the orientation of the yarn of the middle layer.

9. The engine intake guard of claim 7, wherein the each of the layers is interlaced only with an adjacent layer.

10. The engine intake guard of claim 1, wherein the primary and secondary screens are configured to allow air to pass through the screen.

\* \* \* \* \*